(12) United States Patent
Högström et al.

(10) Patent No.: US 11,943,420 B2
(45) Date of Patent: Mar. 26, 2024

(54) METHOD AND SYSTEM FOR ALIGNMENT OF DATA

(71) Applicant: TOBII AB, Danderyd (SE)

(72) Inventors: Jonas Högström, Danderyd (SE); Erik Alsmyr, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/810,092

(22) Filed: Jun. 30, 2022

(65) Prior Publication Data

US 2023/0007224 A1 Jan. 5, 2023

(30) Foreign Application Priority Data

Jun. 30, 2021 (SE) .................... 2150848-6

(51) Int. Cl.
*H04N 13/167* (2018.01)
*G06F 3/03* (2006.01)
(Continued)

(52) U.S. Cl.
CPC ......... *H04N 13/167* (2018.05); *G06F 3/0304* (2013.01); *G06V 40/18* (2022.01); *H04N 2013/0096* (2013.01)

(58) Field of Classification Search
CPC ........ G06F 3/013; G06F 3/0304; G06F 3/017; G06F 3/012; G06F 21/32;
(Continued)

(56) References Cited

U.S. PATENT DOCUMENTS 5,786,765 A * 7/1998 Kumakura ............. G08B 21/06
340/576
8,820,934 B1 * 9/2014 Ho .......................... G02C 7/04
351/219
(Continued)

FOREIGN PATENT DOCUMENTS

CN 103959767 A 7/2014
CN 105745601 A 7/2016
(Continued)

OTHER PUBLICATIONS

Swedish search report completed Feb. 24, 2022 regarding patent application SE 2150848-6.
(Continued)

*Primary Examiner* — Daniel Chang
(74) *Attorney, Agent, or Firm* — Christopher Ignatius Moylan

(57) ABSTRACT

A user monitoring system receives a first data stream from a first recording device and a second data stream from a second recording device. Each of the first data stream and the second data stream include data relating to an eye of the user. The first data stream and the second data stream overlap temporally. The system processes the first data stream to determine a first blink sequence of the user, processes the second data stream to determine a second blink sequence of the user, and compares the first blink sequence and the second blink sequence to detect a blink pattern present in both the first blink sequence and the second blink sequence. The system determines a temporal offset of the first data stream and the second data stream by comparing respective positions of the blink pattern in the first data stream and the second data stream.

18 Claims, 2 Drawing Sheets

(51) Int. Cl.
*G06V 40/18* (2022.01)
*H04N 13/00* (2018.01)

(58) Field of Classification Search
CPC . G06F 2203/011; A61B 5/1103; A61B 5/163; A61B 2017/00216; A61B 5/6821; H04N 23/611
See application file for complete search history.

(56) References Cited

U.S. PATENT DOCUMENTS

| | | | |
|---|---|---|---|
| 11,553,969 B1* | 1/2023 | Lang | G06T 7/0012 |
| 2011/0122315 A1 | 5/2011 | Schweiger et al. | |
| 2011/0254920 A1* | 10/2011 | Yun | H04N 19/115 |
| | | | 348/E13.001 |
| 2012/0215560 A1* | 8/2012 | Ofek | G16H 70/20 |
| | | | 705/3 |
| 2013/0016882 A1* | 1/2013 | Cavallini | G06F 18/22 |
| | | | 382/117 |
| 2014/0368611 A1* | 12/2014 | Horentrup | G06V 40/18 |
| | | | 348/43 |
| 2016/0011658 A1 | 1/2016 | Lopez et al. | |
| 2016/0140390 A1 | 5/2016 | Ghosh et al. | |
| 2016/0358181 A1 | 12/2016 | Bradski | |
| 2017/0346817 A1 | 11/2017 | Gordon et al. | |
| 2018/0125357 A1* | 5/2018 | Suzuki | A61B 3/145 |
| 2018/0235530 A1* | 8/2018 | Samadani | A61B 5/163 |
| 2019/0205607 A1 | 7/2019 | Hong | |
| 2020/0103960 A1* | 4/2020 | Lee | G06V 40/193 |
| 2020/0409457 A1* | 12/2020 | Terrano | G06F 3/013 |
| 2021/0004078 A1* | 1/2021 | Nakano | A61B 5/16 |
| 2021/0386343 A1* | 12/2021 | Goldenberg | A61B 5/164 |

FOREIGN PATENT DOCUMENTS

| | | |
|---|---|---|
| CN | 107111743 A | 8/2017 |
| EP | 2608546 A1 | 6/2013 |
| WO | 2016004117 A1 | 1/2016 |

OTHER PUBLICATIONS

Extended European search report completed Oct. 26, 2022 regarding patent application EP 22 18 0397.

Chinese Office Action regarding CN App. No. 202210735531.X, dated Sep. 1, 2023.

* cited by examiner

METHOD AND SYSTEM FOR ALIGNMENT OF DATA

CROSS-REFERENCES TO RELATED APPLICATIONS

This application claims priority to Swedish Application No. 2150848-6, entitled "METHOD AND SYSTEM FOR ALIGNMENT OF DATA," filed on Jun. 30, 2021. The entire disclosure of the above-referenced application is incorporated by this reference.

TECHNICAL FIELD

The present invention relates to the handling of multiple streams of data that each include blink data relating to a user. More particularly, the invention relates to the use of blink detection and sequence comparison in order to determine a temporal offset between two or more data streams. This temporal offset can then be used to align the data. The invention also relates to a system configured to utilize such a method.

BACKGROUND OF THE INVENTION

When recording multiple streams of data, it can be important to have them temporally aligned, i.e. aligned in time. The delay between data streams recording by different recording apparatuses can be unpredictable and inconsistent, dependent on many different factors, and therefore it may not be straightforward to determine the level of temporal offset. In some situations, this may not be a problem, but in circumstances where temporal alignment is important, this can be a significant issue.

One particular situation where temporal offset of data streams can be problematic is in the field of attention tracking, where a subject or user is monitored using multiple recording devices. For example, subjects may be monitored using a dedicated eye tracking device and an additional camera that records images of a larger portion of the user, such as their head and shoulders, or their whole body. In order to combine the data gathered from both recording devices, the offset of the two data streams must be determined, otherwise it can lead to errors in data interpretation. Where the data relates to small and fast movements, such as in gaze tracking, small errors in determination of temporal offset of the data streams can lead to large errors in interpretation of the data.

For example, if an eye tracking device is working in conjunction with a second recording device, the second recording device may register an event—such as a sound or a sudden change in illumination—that elicits a reaction from the user. If the timestamp from this event is wrong with respect to the data stream received from the eye tracking device, then conclusions arrived at from this information may be incorrect.

Another example where misaligned streams would be problematic is where a system is designed to capture a dynamic area of attention of a user in conjunction with gaze data, e.g. where a forward-facing camera tracks the changing scene in front of a user and a gaze tracking device determines where the user is looking in the changing scene. If an object is moving in the scene and the user is tracking this object, misaligned data streams may make the user appear to be tracking ahead of or behind the actual object.

For example, a first recording device may capture eye tracking data whilst a second recording device captures an image of the user's head, to provide additional context for analysis of the recording. For example, the second recording device may provide date relating to facial expression or speech of the user. Synchronization of this data may commonly be provided by timestamping the data stream from each recording device. However, timestamping is typically completed noticeably later than when each camera sensor is exposed, resulting in a mismatch between the time stamping of the eye tracking data from the first recording device and the additional data from the second recording device.

It is therefore desired to provide a system and method that overcome or ameliorate the above issues.

BRIEF SUMMARY OF THE INVENTION

According to a first aspect, there is provided a method of determining a temporal offset of data from two recording devices, the method comprising: receiving a first data stream from a first recording device and a second data stream from a second recording device, wherein each of the first data stream and second data stream include data relating to an eye of the user, and wherein the first data stream and second data stream overlap temporally; processing the first data stream to determine a first blink sequence of the user; processing the second data stream to determine a second blink sequence of the user; comparing the first blink sequence and the second blink sequence to detect a blink pattern present in both the first blink sequence and the second blink sequence; and determining a temporal offset of the first data stream with the second data stream by comparing respective positions of the blink pattern in the first data stream and the second data stream. By determining the temporal offset of the data streams, the data streams may be compared or processed in any desired manner with knowledge of how events recorded in either stream correspond to events recorded in the other stream.

The data streams may include data relating to both eyes of the user. This may provide more robust data, as data relating to each individual eye may be correlated together to ignore or remove data that is determined to be inaccurate. Such methods will be known to the skilled person. The first recording device may be an eye tracking device. The use of an eye tracking device can provide data that indicates the gaze position or gaze direction of a user being monitored. The first data stream may include a gaze signal that is processed to determine the first blink sequence. The first data stream may include an eye openness signal that is processed to determine the first blink sequence. The second recording device may be a system recording an entire face of the user. The second recording device may therefore provide an overview of user reaction to stimuli. For example, the second recording device may include data relating to head movement, facial expression, mouth movement, speech, or other such data. The second data stream may include a video signal that is processed to determine the second blink sequence.

One or more of the first stream and the second data stream may include data relating to a scene viewable by the user. This may be useful in such situations where it is desirable to track the gaze of the user relative to a scene that is moving, for example when the user is moving around an area. The first or second recording device may, for example, be a 360-degree camera.

The first blink sequence and the second blink sequence may be compared by way of determining a time between adjacent blinks in the first blink sequence and second blink sequence. The blink pattern may include at least two blinks, or at least three blinks, or at least four blinks, or at least five blinks. By including a greater number of blinks in a blink pattern, incorrect determinations of temporal offset can be limited or avoided. For example, whilst it is possible that a similar or identical pattern of two blinks may occur multiple times in a sequence, it is much less likely that a similar or identical pattern of five blinks may occur multiple times in the sequence.

The method may further comprise the step of temporally aligning the first data stream with the second data stream using the determined temporal offset. The data streams may, for example, be combined into a single data stream including a combination of data from the first data stream and the second data stream. The method may further comprise: detecting a second blink pattern present in both the first blink sequence and the second blink sequence; determining a second temporal offset of the first data stream and the second data stream by comparing respective positions of the second blink pattern in the first data stream and the second data stream; and determining a drift value or drift coefficient from the temporal offset and the second temporal offset.

Multiple blink patterns can therefore be detected, whereby each blink pattern is used to determine a temporal offset of the first data stream and the second data stream. The detection of multiple blink patterns may allow drift in clock times of the data streams to be accounted for in the alignment process. By detecting temporal offset at multiple places in the data streams, a drift value or drift coefficient may be determined between the data streams. The drift value or drift coefficient may be used to better align the data streams.

According to a second aspect, there is provided a user-monitoring system, comprising: a first recording device configured to output a first data stream and a second recording device configured to output a second data stream, wherein each of the first and second data streams include data relating to an eye of the user and wherein the first data stream and the second data stream overlap temporally. A processor may be configured to: process the first data stream to determine a first blink sequence of the user; process the second data stream to determine a second blink sequence of the user; compare the first blink sequence and the second blink sequence to detect a blink pattern present in both the first blink sequence and the second blink sequence; and determine a temporal offset of the first data stream and the second data stream by comparing respective positions of the blink pattern in the first data stream and the second data stream. By determining the temporal offset of the data streams, the data streams may be compared or processed in any desired manner with knowledge of how events recorded in either stream correspond to events recorded in the other stream.

The first recording device may be an eye tracking device. The use of an eye tracking device can provide data that indicates the gaze position or gaze direction of a user being monitored. The first data stream may include a gaze signal that is processed to determine the first blink sequence. The first data stream may include an eye openness signal that is processed to determine the first blink sequence. The second recording device may be a system recording an entire face of the user. The second recording device may therefore provide an overview of user reaction to stimuli. For example, the second recording device may include data relating to head movement, facial expression, mouth movement, speech, or other such data. The second data stream may include a video signal that is processed to determine the second blink sequence.

One or more of the first stream and the second data stream may include data relating to a scene viewable by the user. This may be useful in such situations where it is desirable to track the gaze of the user relative to a scene that is moving, for example when the user is moving around an area. The first or second recording device may, for example, be a 360-degree camera. The first blink sequence and the second blink sequence may be compared by way of determining a time between adjacent blinks in the first blink sequence and the second blink sequence.

The blink pattern may include at least two blinks, or at least three blinks, or at least four blinks, or at least five blinks. By including a greater number of blinks in a blink pattern, incorrect determinations of temporal offset can be limited or avoided. For example, whilst it is possible that a similar or identical pattern of two blinks may occur multiple times in a sequence, it is much less likely that a similar or identical pattern of five blinks may occur multiple times in the sequence.

The processor may further be configured to temporally align the first data stream with the second data stream using the determined temporal offset. The data streams may, for example, be combined into a single data stream including a combination of data from the first data stream and the second data stream. The processor may be further configured to: detect a second blink pattern present in both the first blink sequence and the second blink sequence; determine a second temporal offset of the first data stream and the second data stream by comparing respective positions of the second blink pattern in the first data stream and the second data stream; and determine a drift value or drift coefficient from the temporal offset and the second temporal offset.

Multiple blink patterns can therefore be detected, whereby each blink pattern is used to determine a temporal offset of the first data stream and the second data stream. The detection of multiple blink patterns may allow drift in clock times of the data streams to be accounted for in the alignment process. By detecting temporal offset at multiple places in the data streams, a drift value or drift coefficient may be determined between the data streams. The drift value or drift coefficient may be used to better align the data streams.

BRIEF DESCRIPTION OF THE DRAWINGS

Specific embodiments will now be described in detail with reference to the accompanying drawings, in which.

DETAILED DESCRIPTION OF THE INVENTION

Figure 1:
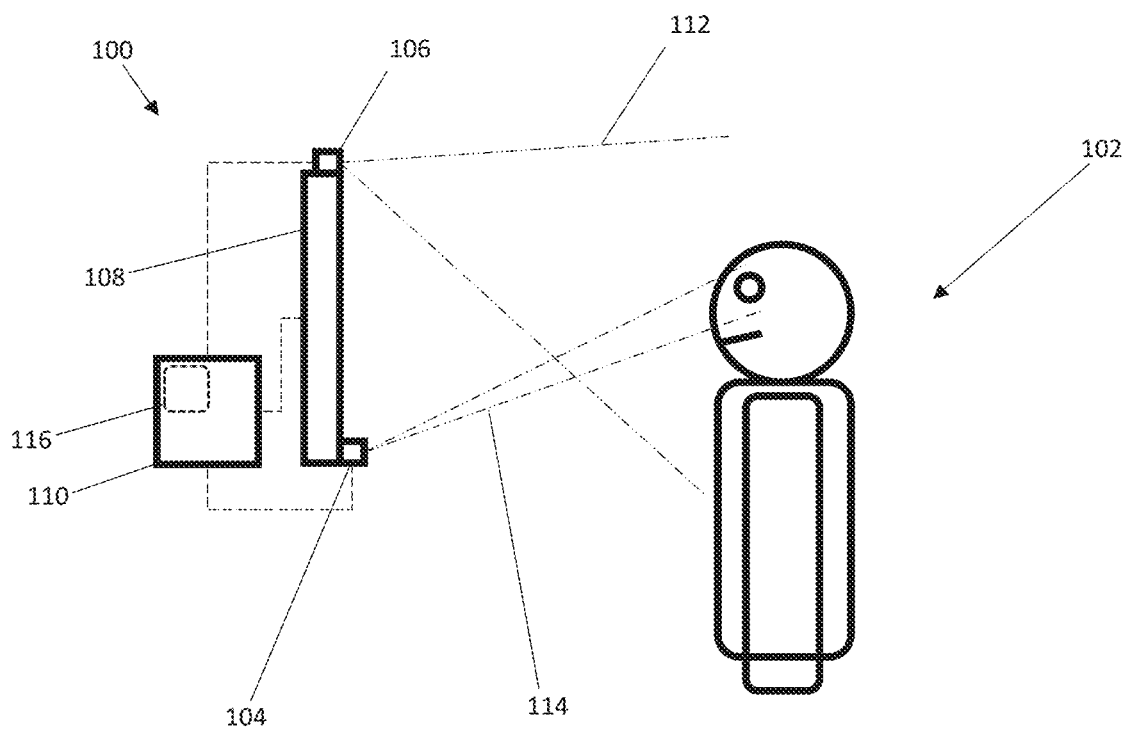
FIG. 1 is a diagrammatic view of a user monitoring system of the second aspect.

Depicted in FIG. 1 is an embodiment of a user monitoring system 100. The user monitoring system 100 is configured to provide multiple data streams of a subject or user 102 of the user monitoring system 100. The user monitoring system 100 therefore includes a first recording device 104 and a second recording device 106. Each of the first recording device 104 and the second recording device 106 are configured to collect data relating to the user 102. During this data collection, the user 102 is looking at a display 108, which may be configured to display information to the user 102. In other embodiments, the display 108 may be omitted.

In the depicted user monitoring system 100, the first recording device 104 is an eye tracking device that outputs a gaze signal indicative of a gaze position of a user 102 on the display 108 or a gaze direction of the user 102 relative to the display 108. The first recording device is situated towards the bottom of the display 108. The positioning of the first recording device 104 may assist with the viewing of the eyes of the user 102 when they are viewing the display 108, but otherwise is not intrinsic to the invention. The first recording device 104 uses an image sensor and associated processing to provide data regarding the gaze of the user 102 to a processor 110. In some embodiments, the eye tracking device may include a near-infrared sensor and may include illuminators that shine towards the eye of the user. The illuminators may assist with the detection of the pupil of the user 102 using well-known effects such as the dark pupil effect or the bright pupil effect. The illuminators may also cause the formation of glints on the cornea of the eye in order to allow pupil center corneal reflection (PCCR) eye tracking or gaze tracking. Alternative arrangements of eye tracking device will be well known to the skilled person. The data from the first recording device 104 can be processed by the processor 110 in order to extract blink information relating to the user. By blink information, it is meant that the occurrence of blinks, and subsequently the time between blinks, can be determined.

The blink data may be generated by use of an eye openness signal. The eye openness signal may indicate the relative position of an eyelid, i.e. a degree of closed-ness of the eye of the user, or a pupil detection value, i.e. whether or not the pupil of the eye can be detected by the eye tracking device. In some embodiments, the gaze signal and the eye openness signal may be used together to determine the presence or absence of blinks. For example, eye openness data from an eye openness signal may be combined with gaze data indicating the presence or absence of the detection of a pupil in order to provide a robust blink detection. Any other methods of tracking the blinking of the user may also be used, and will be known to the skilled person.

The second recording device 106 is an imaging sensor, which, in the depicted embodiment, shows a wider field of view 112 than the field of view 114 of the first recording device 104. The second recording device 106 is configured to provide a view of the user 102 that includes the head and shoulders of the user 102. Included in the field of view 112 are the eyes of the user 102, such that the imaging sensor can output an image of the eyes and more specifically any blinking movement of the eyes. As with the first recording device 104, the blinking of the user 102 may be detected using any well-known method that can be determined from the data collected by the respective recording device 104, 106.

Each of the first recording device 104 and the second recording device 106 are in communication with the processor 110. In the depicted embodiment, the communication is a wired electrical connection, but this may be any sort of communicable connection including both wired connections and wireless connections such as Bluetooth® or Wi-Fi® Any form of connection that allows the conveyance of data between the respective recording device 104,106 and the processor 110 may be used. The processor 110 also includes a memory 116, which allows storage of some or all of the data conveyed to it by the first recording device 104 and the second recording device 106.

The invention is not limited to the specific recording devices shown and described in relation to FIG. 1. For example, the eye tracking device could be replaced by a different recording device such as a imaging device similar to the second recording device. The only limitation for any type of imaging-based recording device is that it captures image data sufficient to detect blinking of the user. Similarly, the data output from the first recording device and the second recording device may not be image data but may be other types of data. For example, the respective recording device may have internal processing that receives image data and converts this into other types of data that can then be processed by the processor. For example, the eye tracking device shown in FIG. 1 may output a gaze vector and/or gaze position to the processor and may also output blink data, also known as a blink sequence, that has been determined from the captured image data. In this way, the processing of the user monitoring system may be split between one or more processors, which may be internal to the first and/or second recording devices or external to both of the recording devices.

Blink data may, for example, include the movement of the eyelid of the user, or may include the detection of the partial or total occlusion of the eye or a part of the eye of the user. In one example embodiment, blink data may be data corresponding to a determination that it is not possible to detect the pupil of the user and that therefore the pupil is occluded from view of the recording device. In another example embodiment, blink data may be data corresponding to a movement of the eyelid detected through differential imaging of the eye of the user. These or other different methods for detecting blinks and providing blink data may be used in conjunction with the present invention, such methods being known to those skilled in the art.

Each data stream may include other data in addition to the blink data, such as accompanying image data, sound data, or any other form of data. The invention therefore provides a way in which any data in the stream—blink data or otherwise—may be aligned with any data in another data stream, by aligning the blink data of both streams.

In some embodiments, the first recording device and/or second recording device may not record image data. For example, one recording device may be an electroencephalogram (EEG) that monitors brain waves. Blinking can be detected using such a device and therefore an EEG may be used along with an eye tracking device or other image-based sensor and the data streams from the two devices may be aligned using the method and system of the present invention. Other non-image based sensors may also be utilized in the system, such as muscle sensors that detect twitching of the eyelid muscles.

In order that the data from the first recording device 104 and the second recording device 106 can be used together, for example in future processing or information extraction, it may need be able to be accurately aligned. To achieve this alignment, the present invention utilizes blink sequences gathered from the first recording device 104 and the second recording device 106. Each blink sequence includes at least information regarding the occurrence of a blink and the time of the blink relative to other blinks, for example by providing the time of each blink relative to a datum. The datum need not be an absolute time, but should be a standardized datum from which all blinks may be measured. For example, the datum may be the start of the recording. Alternatively, each blink may be measured from a datum that provides a time-stamp relative to another blink. For example, each blink may be measured in time relative to another blink, effectively providing an interval between one blink and another blink. The blink from which a subsequent blink is measured may be the immediately preceding blink or may be a different preceding blink.

Figure 2A:
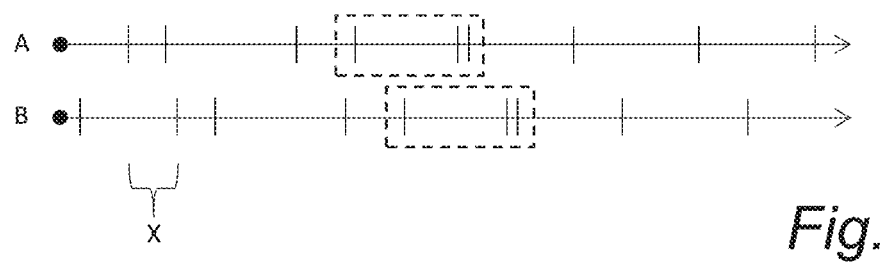
FIGS. 2A and 2B are a graphical depiction of the temporal offset of data streams obtained from the user monitoring system of FIG. 1.
Figure 2B:
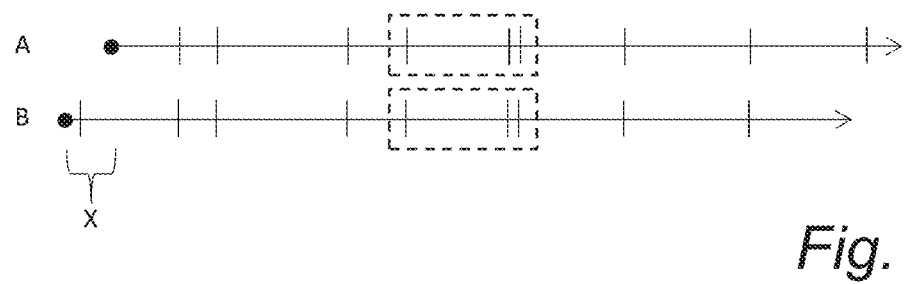

A graphical depiction of blink sequences, or blink data, extracted from first and second recording devices is shown in FIGS. 2A and 2B. In each case, the blink sequence from the first recording device is labelled as A and the blink sequence from the second recording device is labelled as B.

FIG. 2A shows each of blink sequence A and blink sequence B as it is first extracted. Each of blink sequence A and blink sequence B includes a plurality of blinks, shown as lines along a timeline, and a plurality of spaces between these blinks, which are indicative of the time interval between each of the blinks. Blink data for each blink may be stored as a time period relative to a fixed datum rather than measuring a time interval from adjacent blinks directly, but this makes no difference to the implementation of the present invention. As can be seen, the blink sequence A from a first source and the blink sequence B from a second source are essentially the same, as each is of the same user over a similar time period, and therefore the blinks and the intervals between the blinks are offset. Each of blink sequence A and blink sequence B is received by the processor 110 with no knowledge of the temporal offset from the other blink sequence. This offset is labelled as X and is an unknown time period. Although the blink sequences A and B are shown graphically in FIG. 2A, the processor 110 need not process the data graphically, and it may be processed in any other manner, the options for which will be known to the skilled person.

The processor 110 is therefore configured to determine the offset X between the two blink sequences A and B (also referred to as data streams A and B). This is achieved by detecting a pattern of blinks (a "blink pattern") and blink intervals, i.e. the time between respective blinks, that is common to both blink sequences A and B. By detecting the respective blink pattern, the system can then determine that the temporal offset in the blink data from each source is equal to the temporal offset of the detected blink pattern.

A blink pattern that is present in both data streams A and B is depicted as being surrounded by a dotted box in FIGS. 2A and 2B. The blink pattern within the box is a sequence of three blinks and two blink intervals. In each stream A and B, the blink pattern is identical, with the blink interval between the first blink and the second blink of the sequence being equal in both streams A and B and the blink interval between the second blink and the third blink of the sequence being equal in both streams A and B. Once this blink pattern has been detected by the processor, it is a simple operation to align the streams A and B in order that the data received from each of stream A and stream B may be compared relative to a common datum.

For example, the blink sequence detected in the first blink sequence A may be:

"blink; 8300 ms; blink; 1500 ms; blink"

This pattern of blinks and blink intervals will then be searched for in the whole of the second blink sequence B until a match is found. Once the match is found, the relative alignment of the data from each of blink sequence A and blink sequence B will be determinable.

Once the temporal offset is known, the data can be aligned, as shown in FIG. 2B. This is graphically shown in FIG. 2B by the offset of the beginning of each of data stream A and data stream B. As can be seen, the rest of the blink data, including but not limited to the blink pattern detected in FIG. 2B, is aligned. Thus, any other data received from the first recording device and second recording device, such as gaze data or image data, can also be aligned by processing it with the same temporal offset.

A blink pattern may comprise two or more blinks separated by one or more blink intervals. At a minimum, two blinks are required, but these blinks need not necessarily be adjacent, as long as it can be determined that the interval between the blinks is the same for each blink sequence. It may be beneficial for a blink pattern to be detected that comprises a greater number of blinks. By detecting a blink pattern with a greater number of blinks, it can be determined with more certainty that the detected blink pattern in each of the blink sequences A and B corresponds to the same temporal period, as it is unlikely the exact same blink pattern, i.e. a pattern with the same intervals between blinks, will occur more than once, and the longer the blink pattern the less likely it will be that such a blink pattern will be duplicated within the blink sequences A and B.

If, for example, a blink pattern is detected as occurring more than once in either of the blink sequences A and B, then the system may look for a different blink pattern for comparison purposes, or may look for a longer blink pattern (that may or may not include the original blink pattern), until such a time as it can be shown that the blink pattern occurs only once in the first and second blink sequences A and B. Thus, potential mis-determination of the alignment of the blink sequences A and B can be avoided.

It will be apparent that a failure to match a particular blink pattern to both blink sequences A and B may occur due to a failure of one or more of the recording devices to detect one or more blinks. This may occur, for example, if the user turns their head away from the device or if an eye tracking algorithm fails temporarily. In such cases, if it has not been possible to detect a match to a specific blink pattern, the system may search for a different blink pattern in each of the blink sequences A and B. This process may recur until such a time as a detected blink pattern is found in both of the blink sequences A and B.

It may also be beneficial to repeat the process of blink pattern detection multiple times during a recording session, especially if that session is long. This is because there may be drift between clocks for each recording device over time, and therefore it may be advantageous to determine a temporal offset between the recording devices at multiple times during a recording session. The use of a plurality of different blink patterns throughout a recording session may allow the drift during the session to be detected, and this can also then be used by the system to better align the data streams. Drift may be determined as a drift value or drift coefficient that can be applied across the data streams to assist with alignment.

Figure 3:
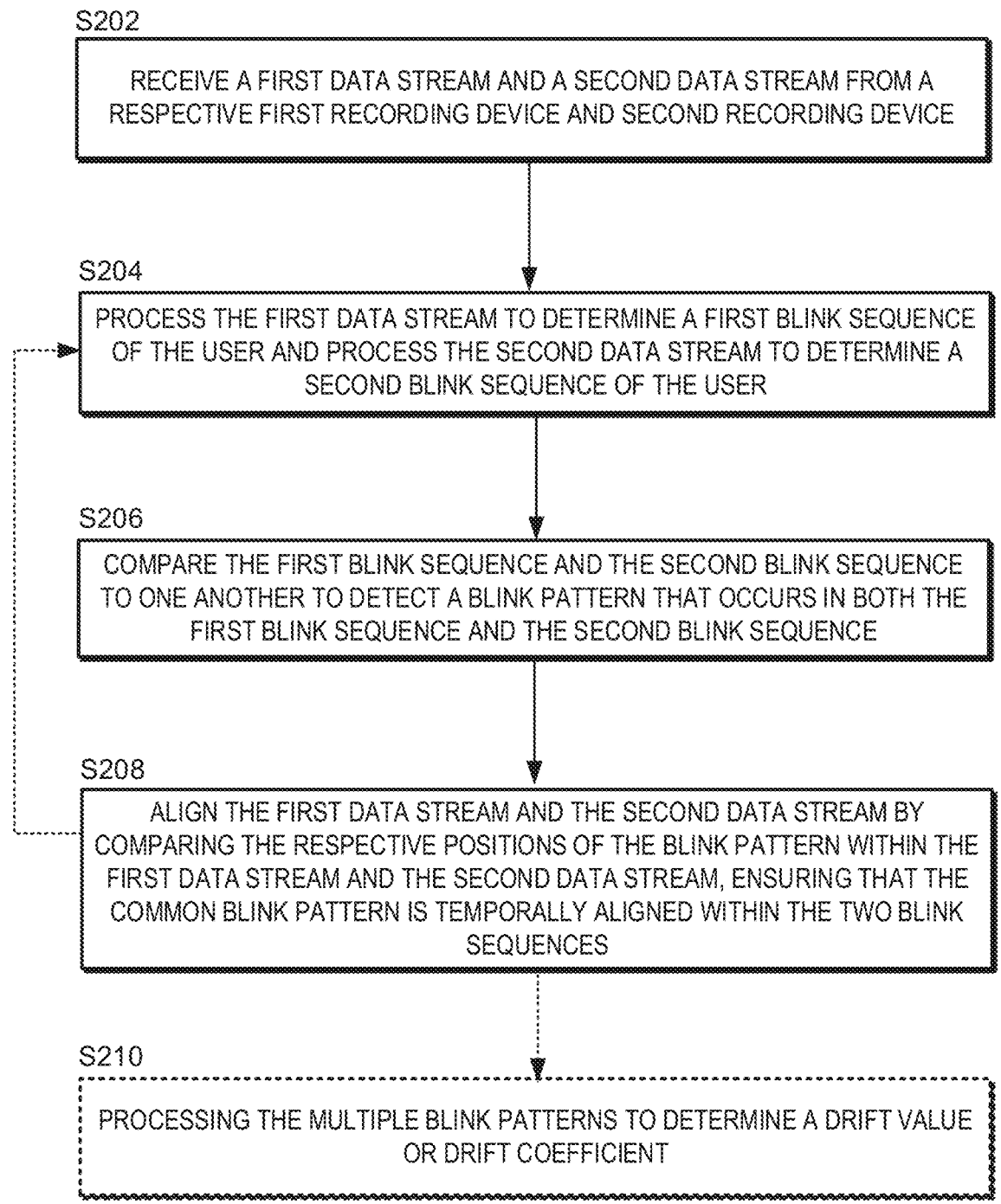
FIG. 3 is a flow chart of the method of the first aspect.

FIG. 3 is a flow chart showing each step involved in the execution of the disclosed method. In a first step S202, a first data stream and a second data stream are received from the respective first recording device and second recording device referenced in FIG. 1. These data streams include data relating to the eyes of the user, and in particular include data that allows a processor to determine when the user being recorded has blinked.

The data streams can then be processed in a following step S204 in order to determine a blink sequence of the user. Each data stream is processed separately in order to determine an individual blink sequence, i.e. the first data stream is processed to determine a first blink sequence and the second data stream is processed to determine a second blink sequence.

In a further step S206, the first blink sequence and the second blink sequence can be compared to one another in order to detect a blink pattern that occurs in both the first blink sequence and the second blink sequence.

Once a common blink pattern has been detected, the first and second data streams can be aligned S208 by comparing the respective positions of the blink pattern within the data streams, and ensuring that the common blink pattern is temporally aligned within the two blink sequences.

Where desirable, the steps from S204 to S208 may be repeated for additional blink patterns, as shown in FIG. 3 by the dotted arrow. This step may additionally be accompanied by the processing of the multiple blink patterns in step S210, in order to determine a drift value or drift coefficient for the system.

Although described in relation to two data streams, the present invention could equally be applied to three, four, or any other number of data streams. In each case, all that is required is that the blink pattern is detected as being present in each of the data streams being considered. All data streams can then be aligned by use of the same blink pattern.

In a further arrangement, more than two data streams could be aligned by using a first blink pattern that is detected, for example, in first and second data streams, and a second blink pattern that is detected, for example, in second and third data streams. This could be particularly useful where the data streams do not necessarily overlap temporally across their whole length, i.e. where first and third data streams each overlap temporally with the second data stream but where first and third data streams do not overlap with each other.

What is claimed is:

1. A method of determining a temporal offset of data from two recording devices, the method comprising:
   receiving a first data stream from a first recording device and a second data stream from a second recording device, wherein each of the first data stream and second data stream include data relating to an eye of the user, and wherein the first data stream and second data stream overlap temporally;
   processing the first data stream to determine a first blink sequence of the user;
   processing the second data stream to determine a second blink sequence of the user;
   comparing the first blink sequence and the second blink sequence to detect a blink pattern present in both the first blink sequence and the second blink sequence, wherein the comparison is by way of determining a time between adjacent blinks in the first blink sequence and second blink sequence; and
   determining a temporal offset of the first data stream and the second data stream by comparing respective positions of the blink pattern in the first data stream and the second data stream.

2. The method of claim 1, wherein the first recording device is an eye tracking device.

3. The method of claim 1, wherein the first data stream includes a gaze signal that is processed to determine the first blink sequence.

4. The method of claim 1, wherein the first data stream includes an eye openness signal that is processed to determine the first blink sequence.

5. The method of claim 1, wherein the second recording device is a system recording an entire face of the user.

6. The method of claim 1, wherein the second data stream includes a video signal that is processed to determine the second blink sequence.

7. The method of any preceding claim, wherein the blink pattern includes (A) at least two blinks, (B) at least three blinks, (C) at least four blinks, or (D) at least five blinks.

8. The method of claim 1, further comprising the step of temporally aligning the first data stream with the second data stream using the determined temporal offset.

9. The method of claim 1, further comprising:
   detecting a second blink pattern present in both the first blink sequence and the second blink sequence;
   determining a second temporal offset of the first data stream and the second data stream by comparing respective positions of the second blink pattern in the first data stream and the second data stream; and
   determining a drift value or drift coefficient from the temporal offset and the second temporal offset.

10. A user-monitoring system, comprising:
    a first recording device configured to output a first data stream and a second recording device configured to output a second data stream, wherein each of the first and second data streams include data relating to an eye of the user and wherein the first data stream and second data stream overlap temporally; and
    a processor configured to:
      process the first data stream to determine a first blink sequence of the user;
      process the second data stream to determine a second blink sequence of the user;
      compare the first blink sequence and the second blink sequence to detect a blink pattern present in both the first blink sequence and the second blink sequence, wherein the comparison is by way of determining a time between adjacent blinks in the first blink sequence and second blink sequence; and
      determine a temporal offset of the first data stream and the second data stream by comparing respective positions of the blink pattern in the first data stream and the second data stream.

11. The user-monitoring system of claim 10, wherein the first recording device is an eye tracking device.

12. The user-monitoring system of claim 10, wherein the first data stream includes a gaze signal that is processed to determine the first blink sequence.

13. The user-monitoring system of claim 10, wherein the first data stream includes an eye openness signal that is processed to determine the first blink sequence.

14. The user-monitoring system of claim 10, wherein the second recording device is a system recording the entire face of the user.

15. The user-monitoring system of claim 10, wherein the second data stream includes a video signal that is processed to determine the second blink sequence.

16. The user-monitoring system of claim 10, wherein the blink pattern includes (A) at least two blinks, (B) at least three blinks, (C) at least four blinks, or (D) at least five blinks.

17. The user-monitoring system of claim 10, wherein the processor is further configured to temporally align the first data stream with the second data stream using the determined temporal offset.

18. The user-monitoring system of claim 10, wherein the processor is further configured to:
    detect a second blink pattern present in both the first blink sequence and the second blink sequence;
    determine a second temporal offset of the first data stream and the second data stream by comparing respective positions of the second blink pattern in the first data stream and the second data stream; and determine a drift value or drift coefficient from the temporal offset and the second temporal offset.

\* \* \* \* \*